Oct. 7, 1924.

S. B. MACFARLANE ET AL 1,510,487

TORPEDO

Filed Aug. 9, 1920

Inventors
S. B. Macfarlane
and L. J. Barry

By

Attorney

Patented Oct. 7, 1924.

1,510,487

UNITED STATES PATENT OFFICE.

SCOTT B. MACFARLANE AND LOUIS J. BARRY, OF MIDDLETOWN, RHODE ISLAND, ASSIGNORS TO THE GOVERNMENT OF THE UNITED STATES.

TORPEDO.

Application filed August 9, 1920. Serial No. 402,506.

*To all whom it may concern:*

Be it known that we, SCOTT B. MACFARLANE and LOUIS J. BARRY, citizens of the United States, residing at Middletown, Rhode Island, have invented new and useful Improvements in Torpedoes, of which the following is a specification.

This invention relates to improvements in torpedoes and more particularly to improvements in the construction of the controlling gyroscope. While the invention will be hereinafter described with relation to its application to a continuous spin air sustained gyro for torpedoes it will, of course, be understood that without material modification various features of the invention are applicable to gyroscopes generally in whatever way they may be used.

One of the objects of the present invention is to provide an improved gyroscope of simple and practical construction.

A further object is to eliminate as much as possible the effects of air currents upon the outer gimbal ring or other parts of the gyro which might tend to upset the perfect balance of the gyro and, therefore, to a certain extent destroy its intended purpose.

Another object is to provide a gyro with means adapted to increase its efficiency and accuracy.

Other objects will be in part obvious and in part hereinafter pointed out.

Figure 1:
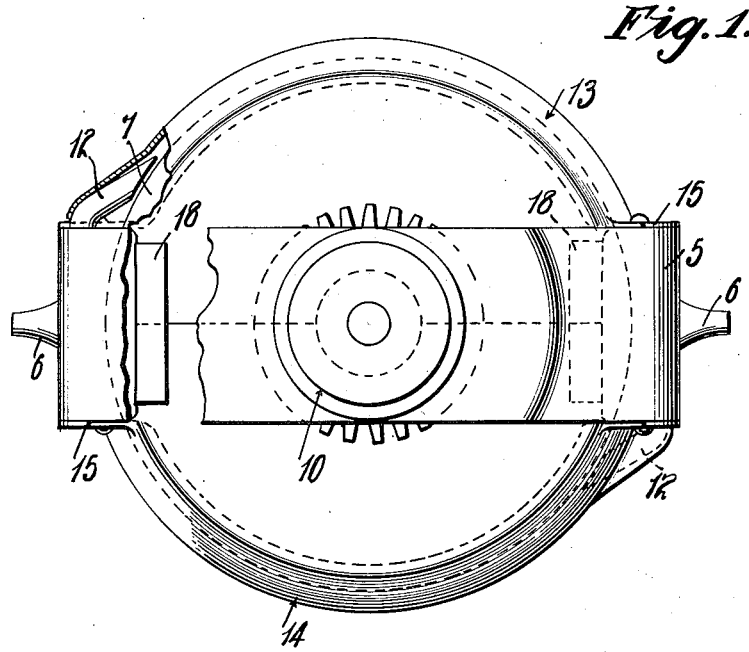
Figure 2:
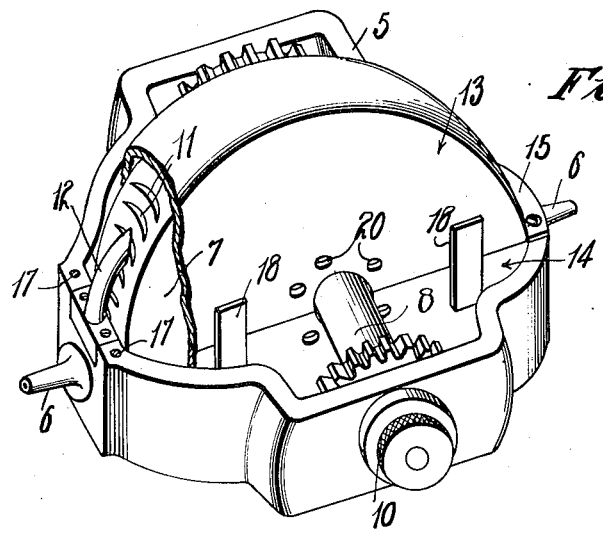

In the accompanying drawings wherein is shown one of various possible embodiments of the invention and in the several views of which similar reference characters denote corresponding parts, Figure 1 is a side elevational view with certain parts broken away, and, Figure 2 is a perspective view of the parts shown in Figure 1.

Referring now to the drawings in detail, 5 denotes the inner gimbal ring of a torpedo gyro which is adapted to be supported by a pivot 6 in an outer gimbal ring not shown, as such outer gimbal and its means of support are well-known to those skilled in the art. The inner gimbal ring carries a gyro wheel 7 supported upon a shaft 8, which shaft is mounted in ball bearings 10 at right angles to the pivot 6 in the ring 5. The gyro wheel is provided with pockets 11 against which air jets from nozzles 12 are adapted to impinge. The air is supplied to these nozzles through suitable ducts, not shown in the gimbal ring, from the hollow pivots 6. The air after passing in through the pivots 6 exhausts from diametrically oppositely disposed nozzles 12 onto the pockets 11 of the gyro wheel. These parts are of more or less well known construction and a detailed description is thought unnecessary.

The principal part of the present invention resides more particularly in the application of a casing to the gyro wheel as shown more clearly in Figure 2. This casing is made preferably in two halves 13 and 14, both parts being provided with lugs 15 through which pass screws or bolts into holes 17 in the inner gimbal ring 5. These halves are also connected by means of straps 18 fastened alternately to the halves of the cover thereby to line-up the sides and insure a good butt joint therebetween. The covers are provided at opposite sides with a plurality of holes 20 to permit the escape of air from the interior of the casing.

From the above description it will be seen that one of the objects of this cover is to prevent the air from the nozzles 12 from impinging upon the outer gimbal or other parts of the gyro and thereby produce an influence which would tend to upset the perfect balance of the gyro during a run of a torpedo or when installed for other purposes.

The invention is of simple and practical construction, has relatively few parts which may be inexpensively manufactured, assembled and installed and is adapted to accomplish, among others, all of the objects and advantages herein set forth.

What we claim is:—

1. In combination with an air sustained gyro wheel, a member surounding the periphery of said wheel, said member having an opening at each side permitting the discharge of air so arranged as to prevent unbalancing of the gyro wheel.

2. In combination with an air sustained gyro wheel, a gimbal ring supporting said wheel, and a cover for said wheel within and supported by said gimbal ring, said cover enclosing the sides and periphery of said wheel and provided with openings at each side for the escape of air thereby to prevent unbalancing of the wheel.

3. In combination with a gyro wheel, a gimbal ring supporting said wheel, nozzles associated with the gimbal ring and a member surrounding said gyro wheel and having openings at each side for the escape of air after the air has engaged with the wheel to prevent unbalancing of the wheel.

4. In combination with an air sustained gyro wheel, a gimbal ring supporting said wheel, nozzles associated with the gimbal ring and a cover enclosing the wheel and the nozzles, said cover being formed of two semi-circular parts connected together along their meeting line and provided with openings at each side for the escape of air, thereby to prevent unbalancing of the gyro wheel.

5. In combination, a gimbal ring, an air sustained gyro wheel supported thereby and a member surrounding the sides and periphery of said wheel comprising two semi-circular hollow parts supported from said ring, and means for connecting the parts together and to the gimbal ring, said parts having exhaust openings at each side of the wheel thereby to prevent unbalancing of the wheel.

6. In combination, an inner gimbal ring having pivots through which a motive fluid is adapted to pass, an air sustained gyro wheel mounted in said ring and provided with pockets, nozzles connected with the outlet pivots arranged to direct a jet of air against said pockets and a member enclosing the sides and periphery of said wheel provided with openings in each side for the escape of air after performing its function, thereby to prevent unbalancing of the wheel.

Signed at New York city this 7th day of May, 1920.

SCOTT B. MACFARLANE.

Signed at Newport, Rhode Island, this 30th day of March, 1920.

LOUIS J. BARRY.